Oct. 14, 1969     HANZO TAGUCHI ET AL     3,472,112
PERFORATED SUPPORT FOR PIANO SOUNDING BOARD
Filed Dec. 15, 1966     3 Sheets-Sheet 1
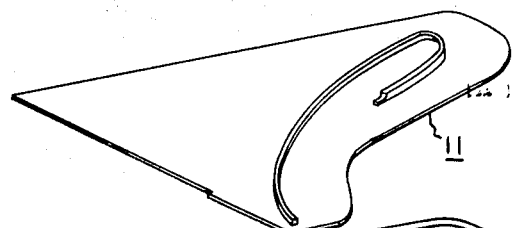
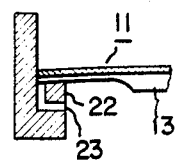
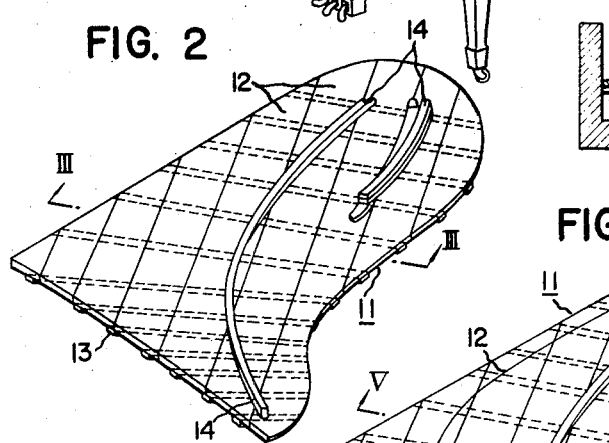
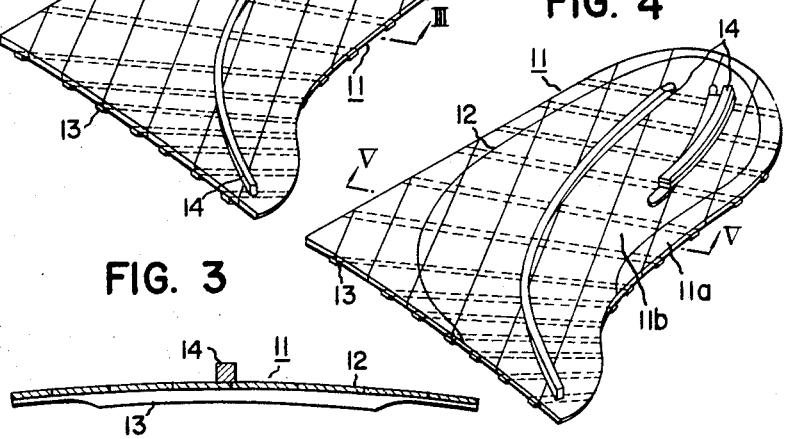
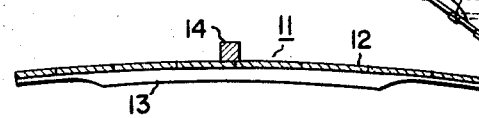

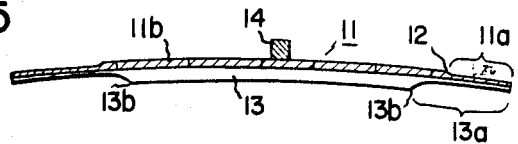
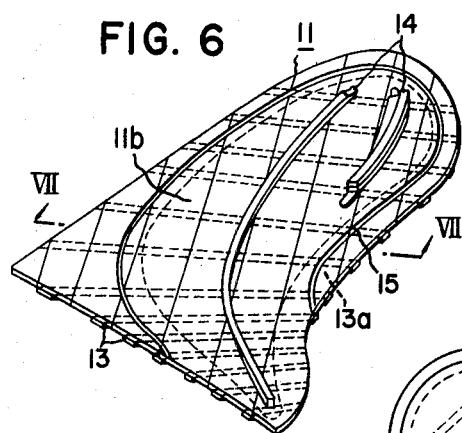
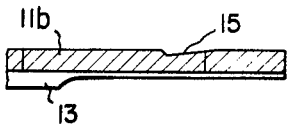
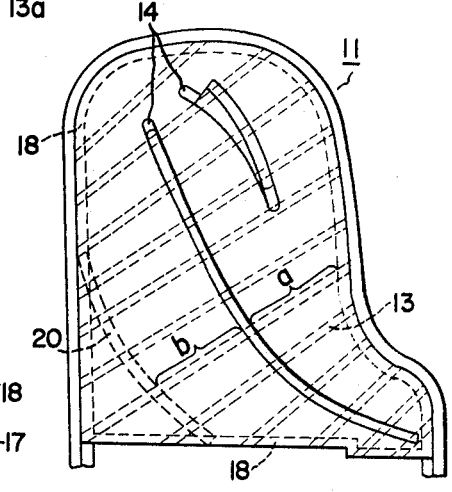
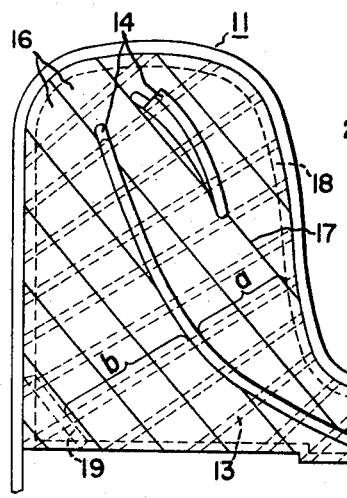
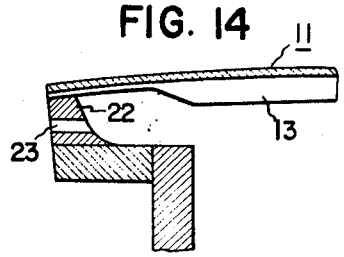
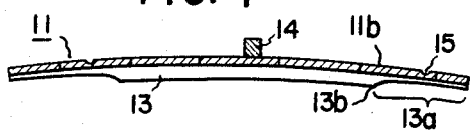

Oct. 14, 1969    HANZO TAGUCHI ET AL    3,472,112
PERFORATED SUPPORT FOR PIANO SOUNDING BOARD
Filed Dec. 15, 1966

United States Patent Office 3,472,112
Patented Oct. 14, 1969

3,472,112
PERFORATED SUPPORT FOR PIANO
SOUNDING BOARD
Hanzo Taguchi, Hamamatsu-shi, and Tsuneo Suzuka, Kawanishi-shi, Japan, assignors to Nippon Gakki Seizo Kabushiki Kaisha, Hamamatsu-shi, Japan, a joint-stock company of Japan
Filed Dec. 15, 1966, Ser. No. 602,060
Claims priority, application Japan, Dec. 21, 1965, 40/79,163; Dec. 27, 1965, 40/107,213; Dec. 29, 1965, 40/108,246; Feb. 15, 1966, 41/13,192; Oct. 11, 1966, 41/94,664
Int. Cl. G10c 3/06
U.S. Cl. 84—192     1 Claim

ABSTRACT OF THE DISCLOSURE

A piano in which a sounding board assembly includes a sounding board, at least one bridge secured on one surface of the sounding board and a plurality of ribs secured on the opposite surface of the sounding board at an angle with respect to the bridge. Means are provided along a substantial portion of the periphery of the sounding board for decreasing rigidity of the peripheral portion thereof and means are also present for supporting the sounding board assembly at the peripheral edge. The supporting means is provided with perforations at portions corresponding to the ribs and the length of the perforations is considerably longer than the width of the ribs.

BACKGROUND OF THE INVENTION

In the conventional grand piano and upright piano, a sounding board assembly comprising a sounding board of a suitable wood, a plurality of parallel spaced apart ribs bonded on the rear surface of the sounding board, and a bridge consisting of one or two spaced-apart pieces which are bonded to the front surface of the sounding board and adapted to support the strings is mounted on the body of the piano by means of a support consisting of a wooden frame which is generally termed a rim and comprises a portion of the main body of the piano.

Throughout the specification and the appended claim, the term "sounding board assembly" is used to designate an assembly comprising a sounding board, a plurality of ribs, and a bridge or bridges as described above.

As is well known in the art, the acoustic properties of the sounding board assembly is greatly influenced by its construction and the method of mounting the same. Heretofore, in many cases the thickness of the sounding board has been generally uniform over the entire surface thereof. In some cases, the thickness of the treble portion is 10 mm., for example, and that of the bass portion is 7 mm., and these two portions are interconnected by a linearly tapering member to gradually vary the thickness of the sounding board from one end to the other thereof. In other cases, the thickness of the sounding board is very gradually varied from its central portion to its peripheral portion. For instance, the thickness of the central portion is 10 mm. whereas that of the peripheral portion is 8 mm., thus shaping the entire sounding board as a portion of a spherical surface of a very large curvature. In any case, the variation in the thickness of the sounding board is very small and gradual with the result that thicknesses of the sounding board at the central portion and at the peripheral portion are considered substantially equal from the standpoint of vibration of the sounding board. Of course, the sounding board of the piano is not constructed to perform a piston motion like that of the diaphragm of a loudspeaker but is constructed to improve sounding action, so that acoustic properties required by a loudspeaker and a piano are naturally different. However, the rigidity of the peripheral portion of the sounding board having a uniform thickness distribution mentioned above is too great for the sounding board to vibrate as required. On the other hand, if the entire area of the sounding board was made very thin to render it more easy to vibrate, it would not withstand the fairly large pressure applied on the sounding board from the strings through the bridge. Accordingly, the sounding board is required to have a substantial mechanical strength and yet must vibrate easily, in other words, to radiate sounds of beautiful timbre.

SUMMARY OF THE INVENTION

Accordingly, the principal object of this invention is to construct a sounding board so that it can readily vibrate with the desired acoustic properties by decreasing the rigidity thereof without essentially decreasing the overall structural strength of the sounding board.

Another object of this invention is to construct the sounding board so that it can vibrate easily by mounting the bridge substantially on the center line of the pattern of the sounding board portion which mainly contributes to the vibration thereof.

In order to decrease the rigidity of the peripheral portion of the sounding board as stated just before, according to one aspect of this invention the thickness of the peripheral portion of the sounding board is substantially less than that of the main body portion thereof. The width of such a thinned peripheral portion is preferably a little less than the length of the feathered portions on the opposite ends of the ribs which are bonded on the rear surface of the sounding board.

According to another aspect of this invention, a groove is provided around the peripheral portion of the sounding board at portions outside of a curve which interconnects the beginning points of feathering the opposite ends of the ribs to suitably decrease the rigidity of said peripheral portion thus causing it to vibrate more readily.

Generally, a sounding board of a piano is constructed by bonding together in side-by-side relation a plurality of substantially parallel wooden board elements which are inclined at an angle with respect to the longitudinal axis of the sounding board and have substantially the same width. As the wood for the board elements, it is preferable to use straight grained boards of spruce. However, it was found that the acoustic properties of the sounding board are not always satisfactory when all portions thereof are fabricated by bonding board elements of the same quality (i.e., the same kind, same density).

Accordingly, one of the features of this invention is to use board elements of higher density at the central portion of the sounding board and board elements of lower density on the outer side thereof thereby to improve the transmission of especially higher frequency tones and to improve the efficiency of sound radiation. Higher density board and lower density board may be woods of the same or different type as long as their densities or numbers of grains per unit lateral length are different.

Another feature of this invention is that at the left hand side of the rim as viewed from the player, an obliquely curved intermediate or auxiliary rim is provided between the left hand frame and the front frame of the rim, with auxiliary rim having the same curvature as the bridge so that the bridge assumes substantially the central position of the vibrating portions of ribs at the medium tone region.

Still another feature of this invention is to provide perforations through the rim of the piano having considerably longer length than the width of the rib at portions corresponding to the positions of ribs to cause the sounding board to vibrate easier, thus improving the characteristic of its treble portion.

BRIEF DESCRIPTION OF THE DRAWINGS

For a more complete understanding of the invention, reference may be had to the following detailed description in connection with the accompanying drawings, in which:

FIG. 1 is an exploded perspective view of a main body and a sounding board assembly of a grand piano with the lid removed;

FIG. 2 is a diagrammatic perspective view of a sounding board assembly for a conventional grand piano;

FIG. 3 is a sectional view, taken along the line III—III of FIG. 2;

FIG. 4 is a perspective view of a sounding board assembly embodying this invention;

FIG. 5 is a sectional view of the sounding board assembly shown in FIG. 4 taken along the line V—V thereof;

FIG. 6 is a perspcetive view of a modified sounding board assembly embodying this invention;

FIG. 7 is a sectional view of the sounding board assembly taken along the line VII—VII thereof;

FIG. 7a is an enlarged sectional view of a portion of a modification of the sounding board assembly shown in FIG. 7;

FIG. 8 is a diagrammatic plan view of a sounding board assembly for grand pianos constructed in accordance with this invention;

FIG. 10 is a plan view showing the mounting portion of a sounding board for grand pianos embodying this invention;

FIG. 14 is a partial sectional view of the rim shown in FIG. 13 taken along the line XIV—XIV thereof;

FIG. 16 is a partial sectional view of the rim taken along the line XVI—XVI in FIG. 13.

DETAILED DESCRIPTION OF THE INVENTION

Figure 9:
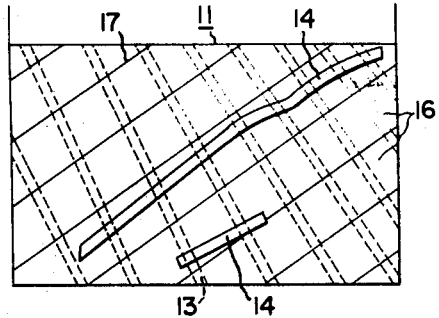
FIG. 9 is a plan view of a sounding board assembly for upright pianos.

Throughout the drawings like or corresponding parts are designated by the same reference numerals.

Although the invention can be applied to various types of pianos as stated above, as an illustrative example, application of the invention to a grand piano will be considered hereunder. As shown in FIG. 1, a grand piano usually comprises a sounding board assembly 11 which is mounted in a hollow casing or a body 10 and generally comprises a plurality of relatively narrow wooden plates or board elements 12 which are inclined with respect to the longitudinal axis of the board and are bonded together into a single flat board along their longitudinal edges by means of a suitable adhesive (usually glue), as shown in FIGS. 2 and 3. On the rear side of the sounding board are secured a plurality of substantially parallel ribs 13 which are also inclined with regard to the longitudinal axis of the board elements 12, preferably by 90°, and on the upper surface of the board is secured a curved bridge 14 adapted to support strings (not shown). For pianos of medium and small sizes, the bridge 14 is divided into two pieces as shown in FIGS. 2 and 4, but for pianos of large size as in full-concert type and semiconcert type grand pianos, the bridge is generally made of a single curved piece (see FIG. 1). For upright type pianos, the bridge is made of two pieces regardless of their size.

Each of the individual board elements comprising the sounding board is usually made of thoroughly dried spruce, maple or the like.

The thickness of the conventional sounding board has been nearly uniform as has been pointed out above and shown in FIG. 3, or the treble portion thereof was made to have a thickness of 10 mm., for example, and the bass portion a thickness of 7 mm., and these portions were interconnected by a linearly tapering member to gradually change the thickness of the sounding board from its one end toward the other. Alternatively, the thickness of the central portion of the sounding board was 10 mm. for example the thickness at the peripheral portion 8 mm., for example, thus constructing a surface of the sounding board as a portion of a spherical surface of an extremely large radius of curvature. In spite of these improvements, the variation in the thickness of the board was very small and very gradual. Thus, the thickness at the central portion and that at the peripheral portion of the sounding board were regarded substantially the same from the standpoint of vibration of a vibrating board. Accordingly, with these conventional constructions it is impossible to expect improvement of the tone quality of pianos. As is well recognized by those skilled in the art, the sounding board assembly of pianos is not constructed to perform a piston motion like that of a diaphragm of loudspeakers but instead is constructed for the purpose of improving tone color and volume. However, in the conventional sounding board of substantially uniform thickness, the rigidity or stiffness of the peripheral portion thereof is too high, so that it is rather difficult for the sounding board to vibrate. On the other hand, in order to facilitate the vibration, if the thickness of the entire area of the board was made too thin, it could not resist the considerably large force of the strings which is transmitted to the board through the bridge. Accordingly, it has long been desired to provide sounding boards which have high mechanical strength yet can vibrate easily.

The invention contemplates the provision of a sounding board which easily vibrates. In other words, the invention contemplates making it possible to produce more beautiful and strong tones from a sounding board of a given dimension and configuration by suitably reducing the rigidity of the sounding board without decreasing the structural strength thereof and by positioning the bridge substantially at the center of the main vibrating portion of the sounding board.

In one embodiment shown in FIGS. 4 and 5, while the general construction and configuration of the sounding board are generally the same as those shown in FIGS. 1, 2 and 3, a substantial portion of peripheral portion 11a is considerably thinner than adjacent inner portion 11b of the sounding board. For example, when the thickness of the adjacent inner portion 11b was 8 mm., the desired satisfactory result was obtained by reducing the thickness of the peripheral portion 11a to 5 mm. In ordinary pianos it is preferable to reduce the thickness of the peripheral portion by 2 to 4 mm. Satisfactory results were obtained when the width of the thinner portion 11a was made a little narrower than the length of the feathered portions at the ends of each rib. This thinner portion 11a on the outer periphery may be provided for the middle and lower tone regions for grand pianos of large size as shown in FIG. 4, but may be provided all about the periphery of the sounding board for upright pianos and small sized pianos. By thus decreasing the thickness of the peripheral portion 11a of the sounding board relative to the adjacent inner portion 11b for a substantial peripheral length, the rigidity of the sounding board is decreased to some extent, thus causing it to vibrate more readily. Moreover, it is possible to make equal the distances between the inner edge of the thinner peripheral portion 11a and the bridge 14 (the nearer side piece where the bridge is divided into two pieces) at both sides of the bridge, as measured along the length of each rib, at the bass and middle tone regions of the sounding board, thus not only increasing the sound volume but also improving the tone quality of the piano.

FIGS. 6 and 7 show an alternative means to decrease the rigidity of the peripheral portion of the sounding board assembly. In this embodiment, a relatively shallow groove 15, having a depth of 1 to 3 millimeters, is provided on the surface of the sounding board having a thickness of about 8 mm. along a curve which is positioned slightly outwardly of a curve which interconnect points at which feathering of the opposite ends of respective ribs 13 begins. As in the case of the thinner peripheral portion 11a of FIG. 4, this groove 15 may be provided around the bass and middle tone regions for grand pianos of large size but may be provided all about the periphery of the sounding board for upright pianos and grand pianos of small size.

Further, as of the partial enlarged view shown in FIG. 7a, the wall inclination of the groove 15 on the side of the inner portion 11b is steep whereas that of the outer wall is gradual.

It was found that the thin groove 15 and the thinned peripheral portion 11a function substantially identically. For example, it was found that a groove 15 of 2 mm. depth provided at a position spaced by 70 mm. from the peripheral edge of the sounding board having a thickness of 8 mm. can attain the desired objects. It has also found that the acoustic properties of the sounding board can be improved by constructing it in the following manner. More particularly, the sounding board assembly for grand pianos is generally constructed as shown in FIG. 8 and for upright pianos as shown in FIG. 9. According to this invention, a number of substantially parallel wooden board elements 16 which are disposed at an angle with respect to the longitudinal axis of the sounding board are bonded together along their longitudinal edges 17 so that they are disposed parallel or substantially parallel to the bridge 14 (in these cases, each for the longer bridge piece), and a bridge 14 and ribs 13 are bonded on the front and rear surfaces of the sounding board assembly 11 thus formed. Board elements at the central portion of the board are selected from woods of higher density, and the density of the sounding board elements are decreased as the distance thereof from the central portion is increased. For example, when spruce is selected, boards of denser grains are used at the central portion, and the densities of grains of the board elements are decreased as the distance from the central portion is increased. Alternatively, different types of woods or woods of different density can also be used. For instance, the central portion of the sounding board may be of maple while outer portions may be of spruce having a lower density than maple.

Even with the same type of wood, spruce, for example, portions having denser grains have greater weight per unit volume or specific gravity (0.41–0.45). Generally, the specific gravity of spruce is about 0.43 on the average, while that of maple is 0.68. Generally, as the density of grains is increased, the Young's modulus is increased, whereby the sound transmission characteristic is improved.

With this construction, the density at the central portion of the sounding board is high, and hence Young's modulus of the board is increased to improve the sound transmission characteristics thereof. On the other hand, the density of the board at the outer portions (left lower and right upper portions as viewed in FIG. 8) is decreased, and Young's modulus decreases. In other words, the outer portions of the sounding board become softer and are easier to vibrate. Upon investigating the vibration mode of the sounding board, it was found that at lower frequencies, the vibration mode is large, so that the sounding board vibrates as a whole, but at higher frequencies, the vibration mode is small, and the sounding board has a tendency to vibrate locally. As a consequence, there is a tendency for small areas near the bridge to vibrate. However, according to the novel sounding board, as the treble portions thereof are comprised by only board elements having denser grains, the transmission characteristic for sounds of higher frequencies is improved, thus improving the efficiency of the sound radiation. In order to further improve the acoustic properties at higher frequencies, a few board elements of higher density which constitute the central portion of the sounding board may be arranged such that their higher density sides of the same board, elements are directed towards the treble portion (right lower portion as viewed in FIG. 8).

The novel sounding board constructed as above described can improve the efficiency of sound radiation even when the same amount of wood as a whole is utilized as compared with the conventional sounding board wherein adjacent board elements are bonded without a consideration of the density of grains thereof.

This invention further contemplates the provision of an intermediate rim of improved construction. More particularly, in the prior piano, the sounding board assembly 11 comprising a sounding board, a bridge, and ribs is supported at its peripheral portion by a rim 18 provided for the main body of the piano as shown by dotted lines in FIG. 8. As indicated in this figure, in the conventional sounding board assembly, at the left front corner thereof as viewed from the player's position, a relatively short linear inclined intermediate rim 19 is provided between the left and front sides of the rim 18, so that the configuration of the sounding board is asymmetrical, and the left front corner is formed at a right angle. As a result, the lengths $a$ and $b$ of the ribs on the opposite sides of the main bridge piece 14 are different. According to this invention, as shown by dotted lines in FIG. 10, intermediate rim 20 is shaped to have substantially the same curvature as the main portion of the bridge 14. When determining the curvature of the intermediate rim 20, care should be taken to make nearly equal the lengths of $a$ and $b$ of the sounding board along the ribs on the opposite sides of the main portion or left hand piece of the bridge 14 at the middle tone region.

Figure 11:
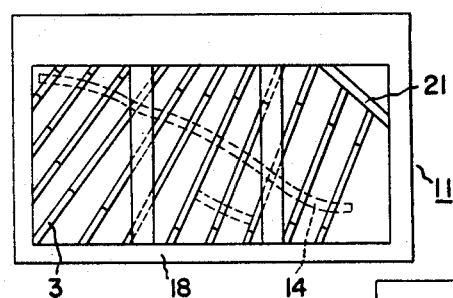
FIG. 11 is a rear view of the mounting portion of a conventional sounding board assembly for upright pianos.
Figure 12:
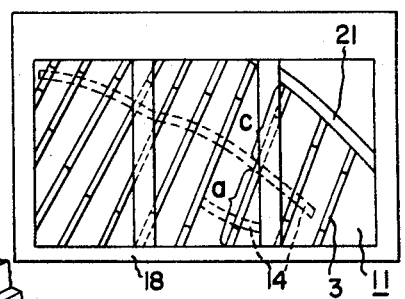
FIG. 12 is a rear view illustrating the mounting portion of the sounding board assembly embodying this invention for upright pianos.
Figure 13:
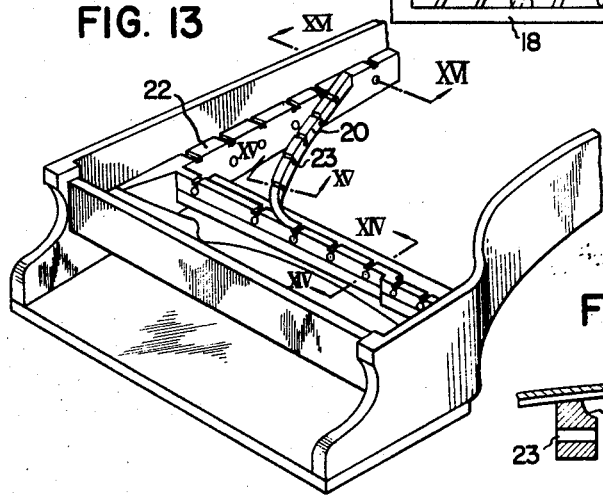
FIG. 13 is a perspective view of a portion of the main body of a piano to indicate the framework or rim constructed in accordance with this invention, with the sounding board assembly removed to clearly show the construction of the framework.
Figure 15:
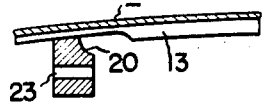
FIG. 15 is a partial sectional view of the rim taken along the line XV—XV in FIG. 13.

This feature is also applicable to upright pianos. Thus, heretofore as shown in FIG. 11, a short straight intermediate rim 21 was provided at the left upper corner of the piano (since FIG. 11 is a rear view, the intermediate rim 21 is shown at the upper right corner). According to this invention, however, the rim 21 is in longer than the prior construction and curved to have substantially the same curvature as the main piece of the bridge 14 as shown in FIG. 12. In this manner, the distances $a$ and $c$ of the sounding board along the ribs on the opposite sides of the bridge to the rim 18 and to the intermediate rim 21 are substantially equal at the middle tone region. This construction not only increases the sound volume of the piano but also improves its tone quality. This is because the bridge excites and drives the sounding board more readily, since the bridge is positioned substantially at the central portion of the transverse vibration length of the sounding board, and the vibration mode of the sounding board has been improved by effectively rounding the peripheral edge or one corner thereof.

FIGS. 13 through 16 indicate an improved rim for supporting the sounding board according to this invention. According to this improvement, perforations 23 having lengths much longer than the width of the respective ribs are drilled through the rim at portions corresponding to the respective ribs, thus causing the sounding board, particularly its treble portion, to vibrate more readily. More particularly, the framework for supporting the sounding board assembly comprises a curved rim 22 (deciding the piano shape) and an intermediate rim 20 which is identical to that shown in FIG. 10, with the sounding board assembly 11 being bonded onto the upper surface of the framework by means of a suitable adhesive, usually glue.

Slightly spaced from the respective ribs 3 which are secured on the lower surface of the sounding board are drilled perforations 23 through rims 20 and 22, and the length of each perforation is selected to be considerably longer than the width of the corresponding rib. The cross-section of each perforation 23 may be of any configuration, for example, elliptical. These perforations 23 provided for the intermediate rim 20 and for the front member of the rim are straight openings which are easy to work, but those provided for the curved rim 22 (sides and back portion of the rim 18) are preferably in the form of a rectangular L-shaped passage as shown in FIG. 16 because the outer casing of the piano is secured to the outer side surface of the curved rim 22. By providing these perforations, the rigidity of the portions of the rim which correspond to portions of the sounding board which are difficult to vibrate owing to the presence of ribs is somewhat decreased thus causing the sounding board to vibrate more readily. This construction is effective especially at the treble portion of the sounding board where the transverse length of the sounding board which undergoes vibration is short. Although the invention has been described mainly in connection with grand pianos, it should be understood that the improvements of this invention can also be applied to upright pianos with the same satisfactory results.

While particular embodiments of this invention have been shown and described, it will be obvious that changes or modifications may be made therein without departing from the invention.

What is claimed is:
1. A piano comprising a sounding board assembly including a sounding board, at least one bridge secured on one surface of said sounding board, a plurality of ribs secured on the opposite surface of said sounding board at an angle with respect to said bridge, means along a substantial portion of the periphery of said sounding board to decrease the rigidity of said peripheral portion of said sounding board, means to support said sounding board assembly at the peripheral edge thereof, and said means to support said sounding board being provided with perforations at portions corresponding to said ribs and the length of said perforations being considerably longer than the width of said rib.

References Cited

UNITED STATES PATENTS

| 2,070,391 | 2/1937 | Bilhuber | 84—192 |
| 2,538,801 | 1/1951 | Schneider | 84—192 |

FOREIGN PATENTS

| 26,020 | 4/1898 | Great Britain. |
| 185,553 | 9/1922 | Great Britain. |

RICHARD B. WILKINSON, Primary Examiner

JOHN F. GONZALES, Assistant Examiner